US012745244B2

(12) United States Patent
Davydov et al.

(10) Patent No.: US 12,745,244 B2
(45) Date of Patent: Sep. 22, 2026

(54) FLEXIBLE UPLINK CONTROL INFORMATION (UCI) TRANSMISSION WITH PHYSICAL UPLINK SHARED CHANNEL (PUSCH)

(71) Applicant: Intel Corporation, Santa Clara, CA (US)

(72) Inventors: Alexei Davydov, Nizhny Novgorod (RU); Yingyang Li, Beijing (CN); Gang Xiong, Portland, OR (US); Daewon Lee, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 301 days.

(21) Appl. No.: 18/548,191

(22) PCT Filed: Feb. 28, 2022

(86) PCT No.: PCT/US2022/018114
§ 371 (c)(1),
(2) Date: Aug. 28, 2023

(87) PCT Pub. No.: WO2022/187129
PCT Pub. Date: Sep. 9, 2022

(65) Prior Publication Data

US 2024/0147470 A1 May 2, 2024

Related U.S. Application Data

(60) Provisional application No. 63/161,338, filed on Mar. 15, 2021, provisional application No. 63/155,218, filed on Mar. 1, 2021.

(51) Int. Cl.
*H04W 72/1268* (2023.01)
*H04L 1/1812* (2023.01)
(Continued)

(52) U.S. Cl.
CPC ....... *H04W 72/1268* (2013.01); *H04L 1/1812* (2013.01); *H04W 72/21* (2023.01); *H04W 72/51* (2023.01)

(58) Field of Classification Search
None
See application file for complete search history.

(56) References Cited

U.S. PATENT DOCUMENTS

| | | | | |
|---|---|---|---|---|
| 11,950,250 B2 * | 4/2024 | Li | ......................... | H04L 5/0094 |
| 2013/0250924 A1 * | 9/2013 | Chen | ..................... | H04L 1/1893 370/336 |

(Continued)

FOREIGN PATENT DOCUMENTS

| | | |
|---|---|---|
| JP | 2019114849 | 7/2019 |
| JP | 2020509620 | 3/2020 |

(Continued)

OTHER PUBLICATIONS

International Patent Office—International Search Report and Written Opinion mailed Jun. 9, 2022 from International Application No. PCT/US2022/018114, 13 pages.

(Continued)

*Primary Examiner* — Steve R Young
(74) *Attorney, Agent, or Firm* — Gray Ice Higdon, PLLC

(57) ABSTRACT

This invention relates an apparatus comprising processing circuitry configured to: determine, based on UE capability information, a position of uplink control information (UCI) within a physical uplink shared channel (PUSCH) transmission; and encode a PUSCH message for transmission that includes the UCI at the determined position.

17 Claims, 13 Drawing Sheets

(51) Int. Cl.

| | |
|---|---|
| ***H04W 72/21*** | (2023.01) |
| ***H04W 72/51*** | (2023.01) |

(56) References Cited

U.S. PATENT DOCUMENTS

| | | | | |
|---|---|---|---|---|
| 2018/0098316 | A1 | 4/2018 | Wang et al. | |
| 2018/0205525 | A1* | 7/2018 | He | H04L 1/1864 |
| 2019/0097779 | A1* | 3/2019 | Wu | H04L 1/1858 |
| 2020/0252185 | A1* | 8/2020 | Zhang | H04L 5/0053 |
| 2020/0305147 | A1 | 9/2020 | Lee et al. | |
| 2021/0250142 | A1* | 8/2021 | Wang | H04L 5/0053 |
| 2022/0183000 | A1* | 6/2022 | Bai | H04L 1/0031 |
| 2022/0248410 | A1* | 8/2022 | Lee | H04L 5/0064 |
| 2023/0254086 | A1* | 8/2023 | Hao | H04L 1/0026<br>370/329 |

FOREIGN PATENT DOCUMENTS

| | | | |
|---|---|---|---|
| JP | 2020537415 | | 12/2020 |
| JP | 2021503836 | | 2/2021 |
| KR | 20200133256 | A | 11/2020 |
| KR | 20200144112 | A | 12/2020 |
| WO | 2019021487 | | 1/2019 |
| WO | 2020/029773 | A1 | 2/2020 |
| WO | 2020168223 | | 8/2020 |

OTHER PUBLICATIONS

Japanese Patent Office, Office Action issued in Application No. JP2023-553039, 11 pages, dated Oct. 21, 2025.

* cited by examiner

Application/ Content Server 838
DN 836
CN 820
RAN 804
AN 808
Uu
UE 802
AP 806
LTE RAN 810
eNB 812
NG-RAN 88
gNB 816
Xn
ng-eNB 818
NG
LTE CN 822
MME 824
SGW 826
SGSN 828
HSS 830
PGW 832
PCRF 834
S1-MME
S1-U
S3
S6a
S11
S5
Gx
SGI To DN
To DN
To RAN
5GC 840
AUSF 842
AMF 844
SMF 846
UPF 848
NSSF – 850
NEF – 852
NRF – 854
PCF – 856
UDM – 858
AF – 860
N1
N2
N3
N4
N5
N6 To DN
N7
N8
N10
N11
N12
N13
N15
N22
Nnssf
Nnef
Nnrf
Npcf
Nudm
Nnaf
Nausf
Namf
Nsmf
To UE
To RAN
800

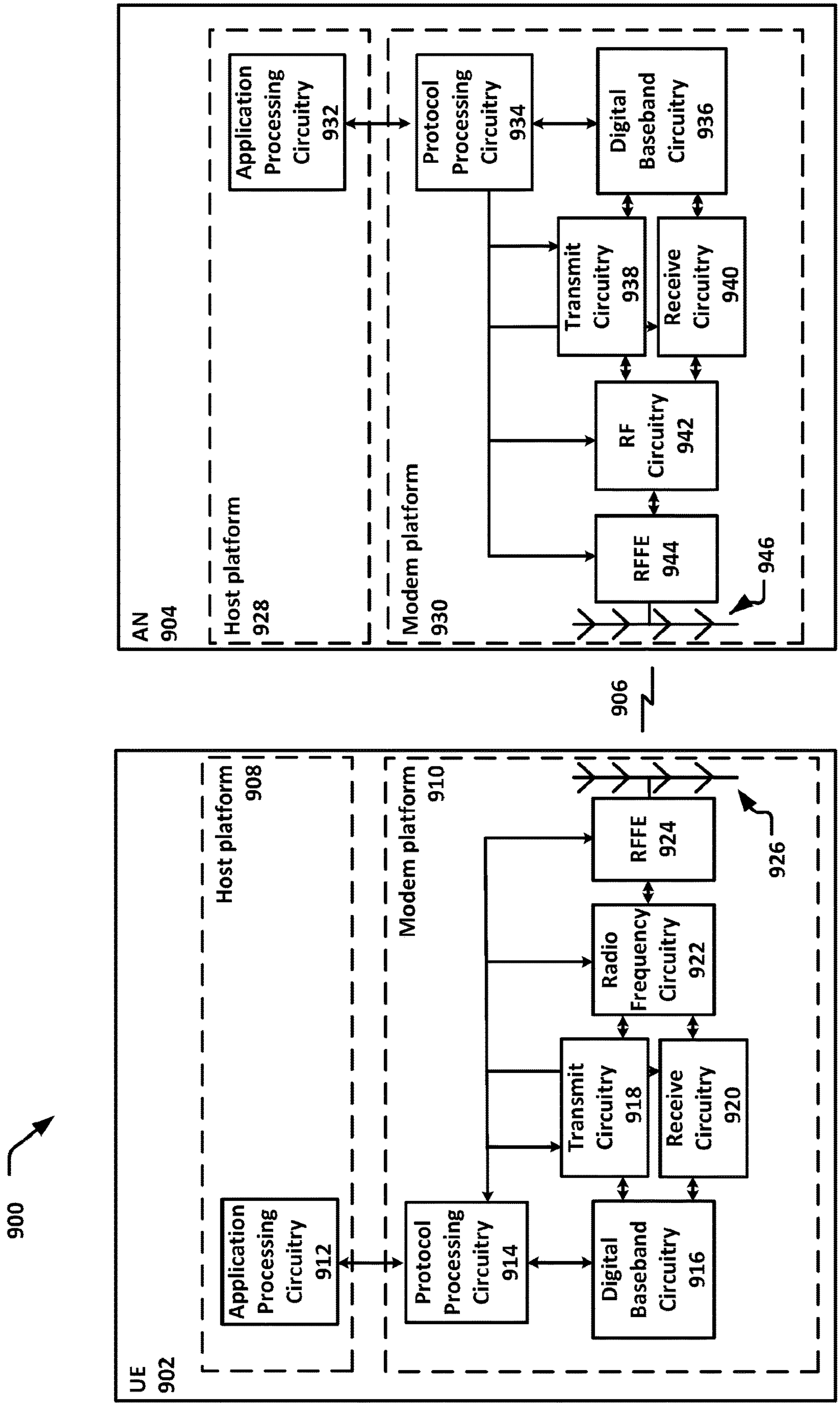

Host platform
908

Application Processing Circuitry 912

Modem platform
910

Protocol Processing Circuitry 914

Digital Baseband Circuitry 916

Transmit Circuitry 918

Receive Circuitry 920

Radio Frequency Circuitry 922

RFFE 924

926

906

AN
904

Host platform
928

Application Processing Circuitry 932

Modem platform
930

Protocol Processing Circuitry 934

Digital Baseband Circuitry 936

Transmit Circuitry 938

Receive Circuitry 940

RF Circuitry 942

RFFE 944

946

1100

Determining, based on UE capability information, a position of uplink control information (UCI) within a physical uplink shared channel (PUSCH) transmission
1105

Encoding a PUSCH message for transmission that includes the UCI at the determined position
1110

Determining, based on one or more UE capabilities, a position of uplink control information (UCI) to be transmitted in conjunction with a physical uplink shared channel (PUSCH) transmission
1205

Encoding a PUSCH message for transmission that includes the UCI at the determined position
1210

Receiving, from a user equipment (UE), uplink control information (UCI) transmitted in conjunction with a physical uplink shared channel (PUSCH) transmission
1305

Encoding a message for transmission to the UE that includes downlink control information (DCI) that acknowledges the UCI, wherein the DCI includes an indication of a hybrid automatic repeat request (HARQ) process number associated with the UCI
1310

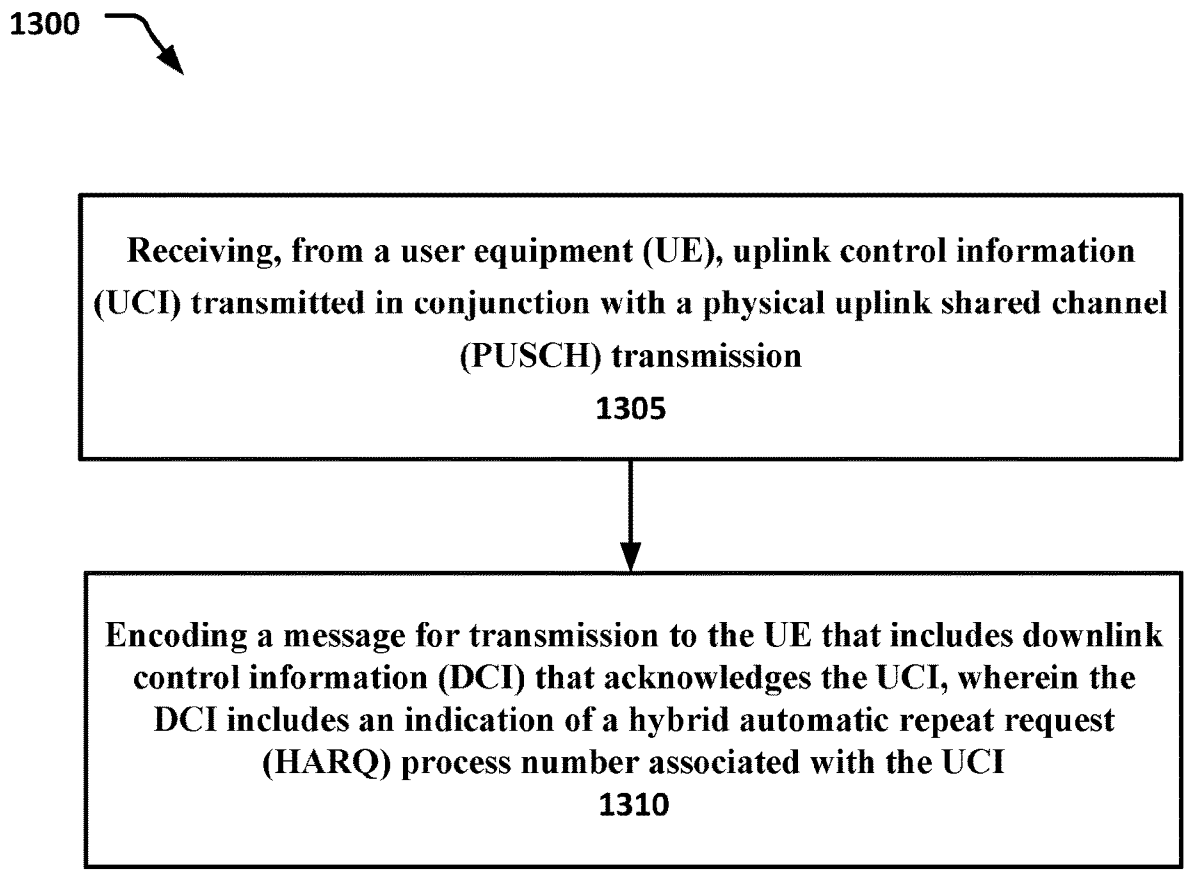

Figure 13

FLEXIBLE UPLINK CONTROL INFORMATION (UCI) TRANSMISSION WITH PHYSICAL UPLINK SHARED CHANNEL (PUSCH)

CROSS REFERENCE TO RELATED APPLICATION

The present application is a national phase entry under 35 U.S.C. § 371 of International Application No. PCT/US2022/018114, filed Feb. 28, 2022, entitled "FLEXIBLE UPLINK CONTROL INFORMATION (UCI) TRANSMISSION WITH PHYSICAL UPLINK SHARED CHANNEL (PUSCH)," which claims priority to U.S. Provisional Patent Application No. 63/155,218, which was filed Mar. 1, 2021; U.S. Provisional Patent Application No. 63/161,338, which was filed Mar. 15, 2021, the entire disclosures of which are hereby incorporated by reference.

FIELD

Various embodiments generally may relate to the field of wireless communications. For example, some embodiments may relate to uplink control information (UCI) transmitted in conjunction with physical uplink shared channel (PUSCH).

BACKGROUND

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simple and seamless wireless connectivity solutions. NR will enable everything connected by wireless and deliver fast, rich content and services.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 9 schematically illustrates components of a wireless network in accordance with various embodiments.

FIGS. 11, 12, and 13 depict examples of procedures for practicing the various embodiments discussed herein.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Figure 1:
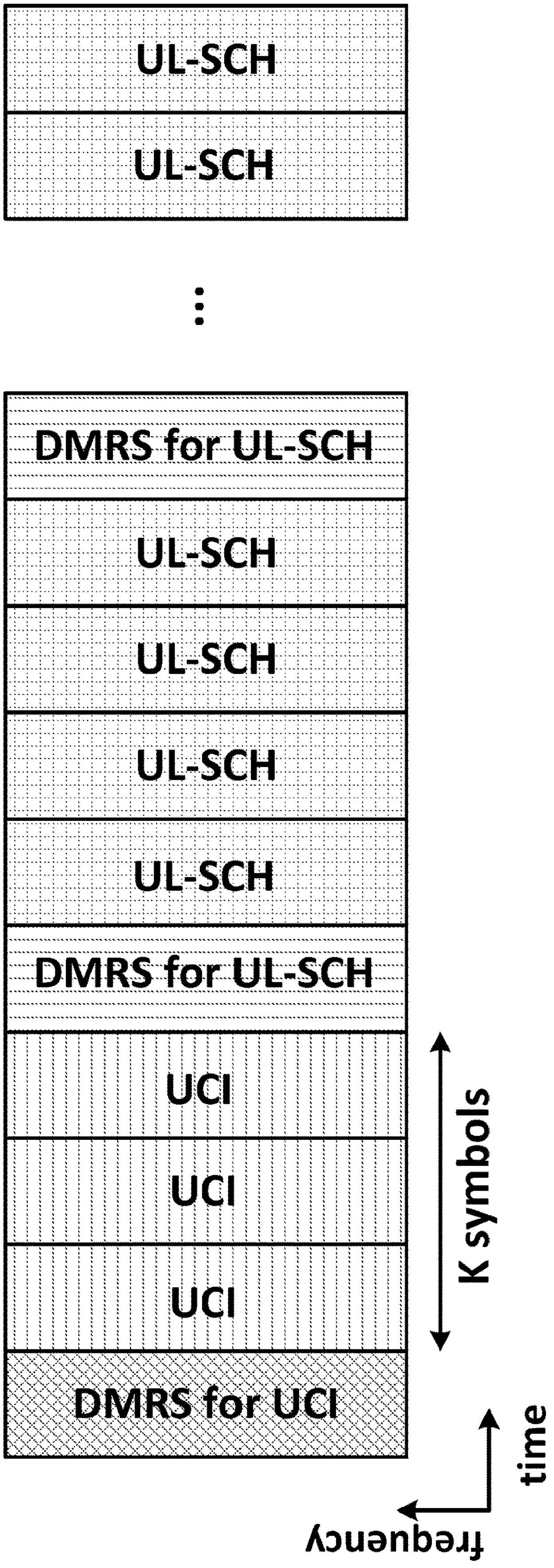
FIG. 1 illustrates an example of a front-loaded UCI transmission on PUSCH in accordance with various embodiments.

In some embodiments, uplink control information (UCI) can be carried by a physical uplink shared channel (PUSCH) transmission. In particular, UCI may include one or more of the following: scheduling request (SR), hybrid automatic repeat request—acknowledgement (HARQ-ACK) feedback, channel state information (CSI) report, e.g., channel quality indicator (CQI), pre-coding matrix indicator (PMI), CSI resource indicator (CRI) and rank indicator (RI) and/or beam related information (e.g., L1-RSRP (layer 1-reference signal received power)). UCI on PUSCH is typically transmitted in the beginning of the PUSCH transmission and co-located with front loaded DM-RS symbol. FIG. 1 illustrates an example of a "front-loaded" UCI transmission in conjunction with PUSCH.

Figure 2:
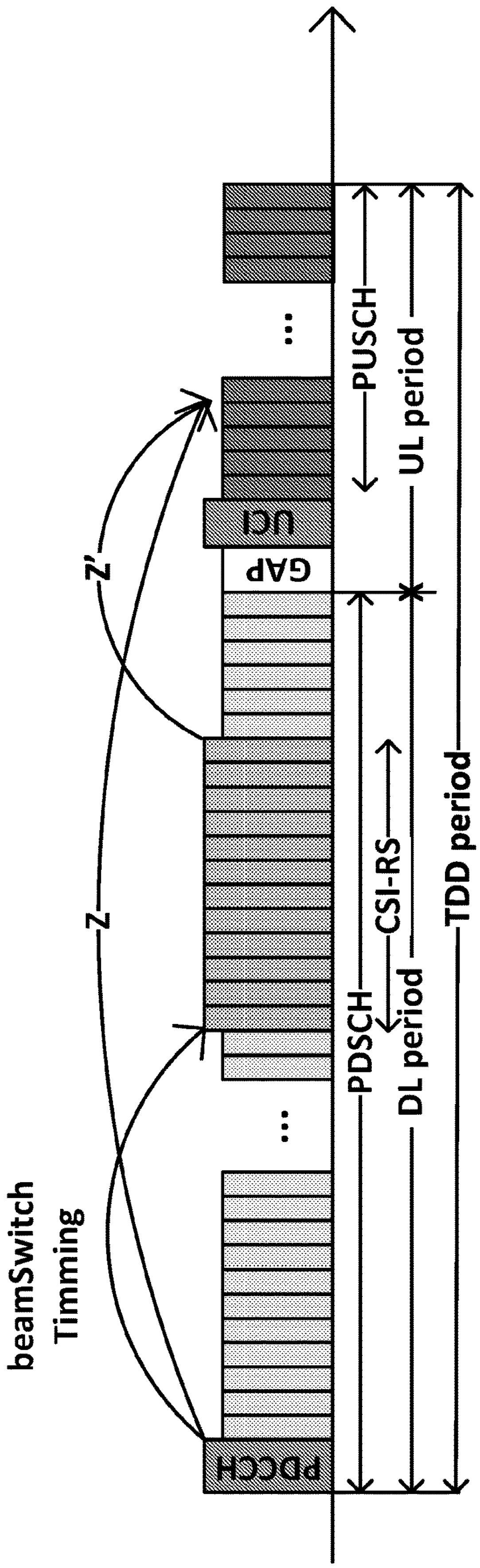
FIG. 2 illustrates an example of a UCI transmission on PUSCH in accordance with various embodiments.

Rel-15 NR supports aperiodic CSI-RS triggering using UL DCI formats. More specifically, DCI can indicate triggering of aperiodic CSI-RS transmission in DL, CSI reporting in UL and PUSCH transmission. As illustrated in FIG. 2, when CSI-RS is used for beam management, minimum duration of beamSwitchTimming (measured in symbols or absolute time quantized with DFT-s-OFDM symbol duration) should be provided for the UE between last symbol of PDCCH and the first symbol of CSI-RS. This time can be used by the UE for PDCCH decoding and application of the beam indicated in DCI for CSI-RS reception.

In addition to beamSwitchTimming, a UE should be also provided with at least Z' symbols between last symbol of CSI-RS and first symbol of UCI. The above time duration is used for CSI-RS measurements and preparation of UCI report. Due to processing timelines above and possibly flexible CSI-RS transmission in the DL portion, it is difficult to guarantee front loaded DM-RS transmission.

Prior standards and techniques support only front-loaded UCI transmission, and these existing approaches are very restrictive, and may introduce several constraints on PUSCH scheduling flexibility to ensure that all processing timelines are met. Various embodiments herein address these and other issues by providing systems and methods for flexible UCI transmission on PUSCH with UL-SCH multiplexing, where UCI can be transmitted in different parts of an uplink transmission.

In some embodiments, a CBB (code block bundle) is a collection of OFDM symbols that contains an integer number of codeblocks. It is used to facilitate efficient processing at the receiver. In some embodiments, the CBB size (the number of DFT-s-OFDM symbols) has a fixed size for a given PUSCH transmission and can take values of 1, 2, 4 or 8.

Figure 3:
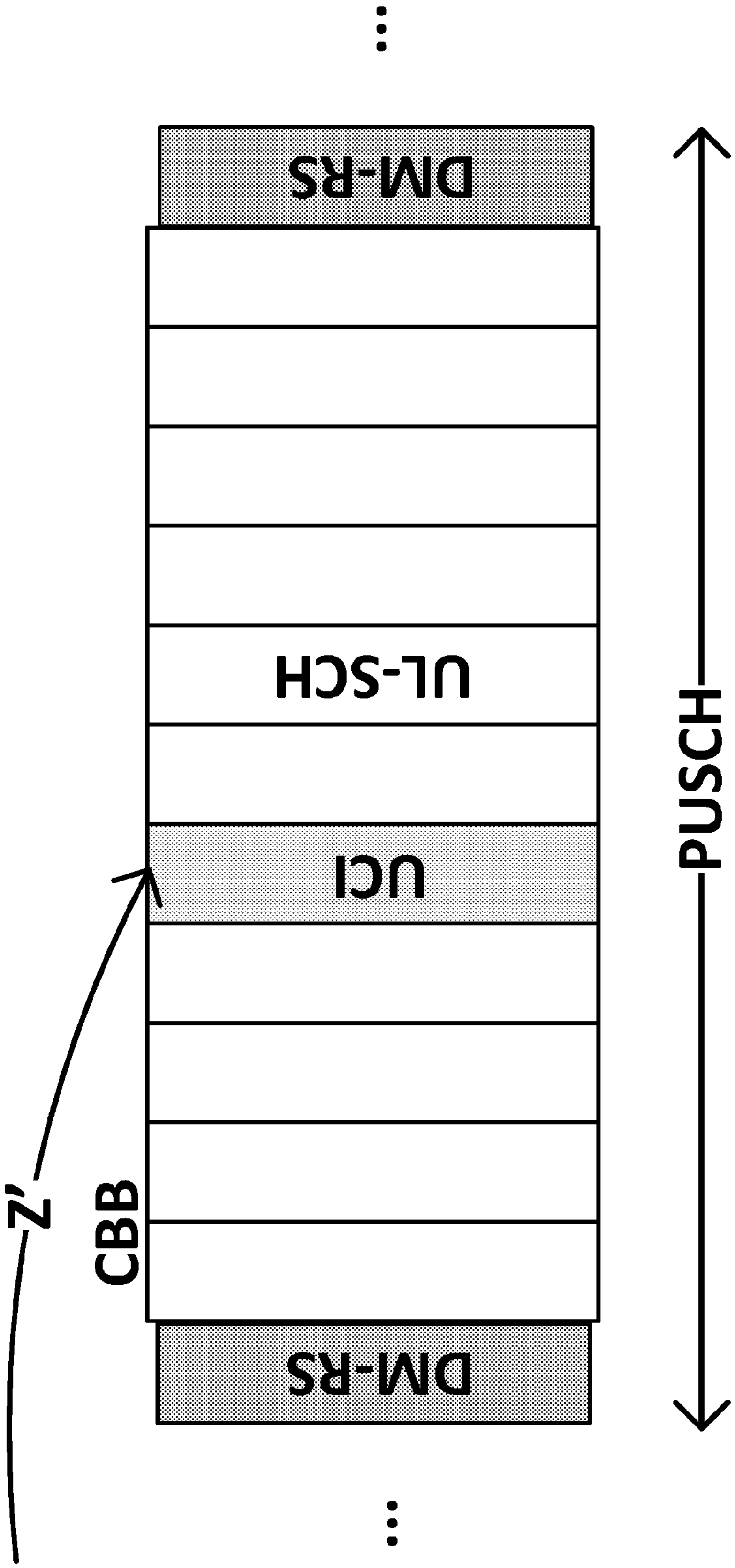
FIGS. 3-7 illustrate examples of various embodiments for UCI transmission in conjunction with PUSCH.

In one embodiment, the UCI transmission on PUSCH (also carrying UL-SCH) is performed in the first DFT-s-OFDM symbol satisfying UE capability for Z' and Z taking into account CBBs boundaries. An example of a corresponding embodiment is illustrated in FIG. 3, where a CBB of size 2 is shown and the UCI is transmitted between two adjacent CCBs. Further, UCI transmission may puncture the UL-SCH on PUSCH, or UL-SCH may be rate-matched around the UCI transmission. In this case, some DFT-s-OFDM symbols in a CBB may be used for UCI transmission. Note that this can also be applied for other embodiments.

Figure 4:
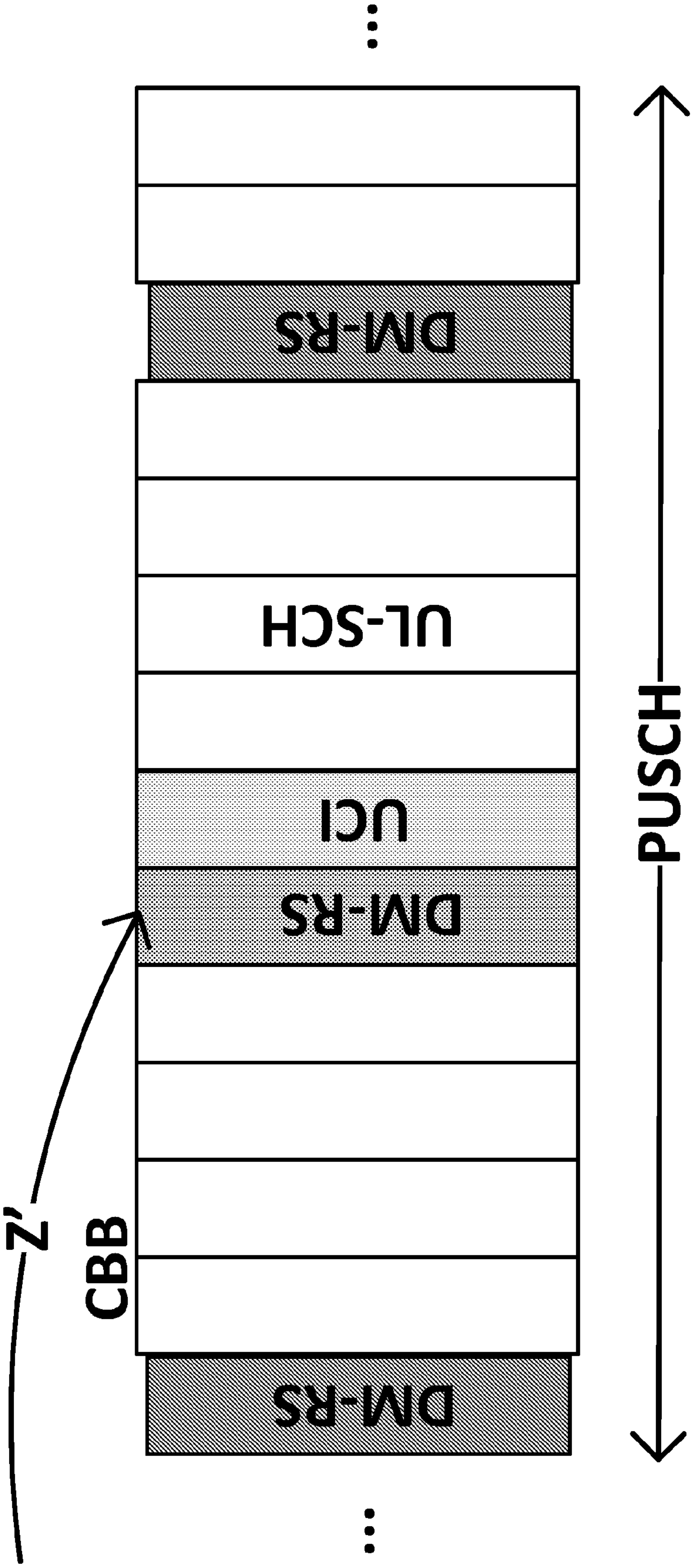

In another example of this embodiment, an additional DM-RS symbol for UCI can be transmitted in the adjacent symbol to UCI (e.g. before UCI). An example of a corresponding embodiment is illustrated in FIG. 4. If the additional DM-RS overlaps with the DM-RS symbol for UL-SCH transmission, this additional DM-RS symbol is skipped.

Figure 5:
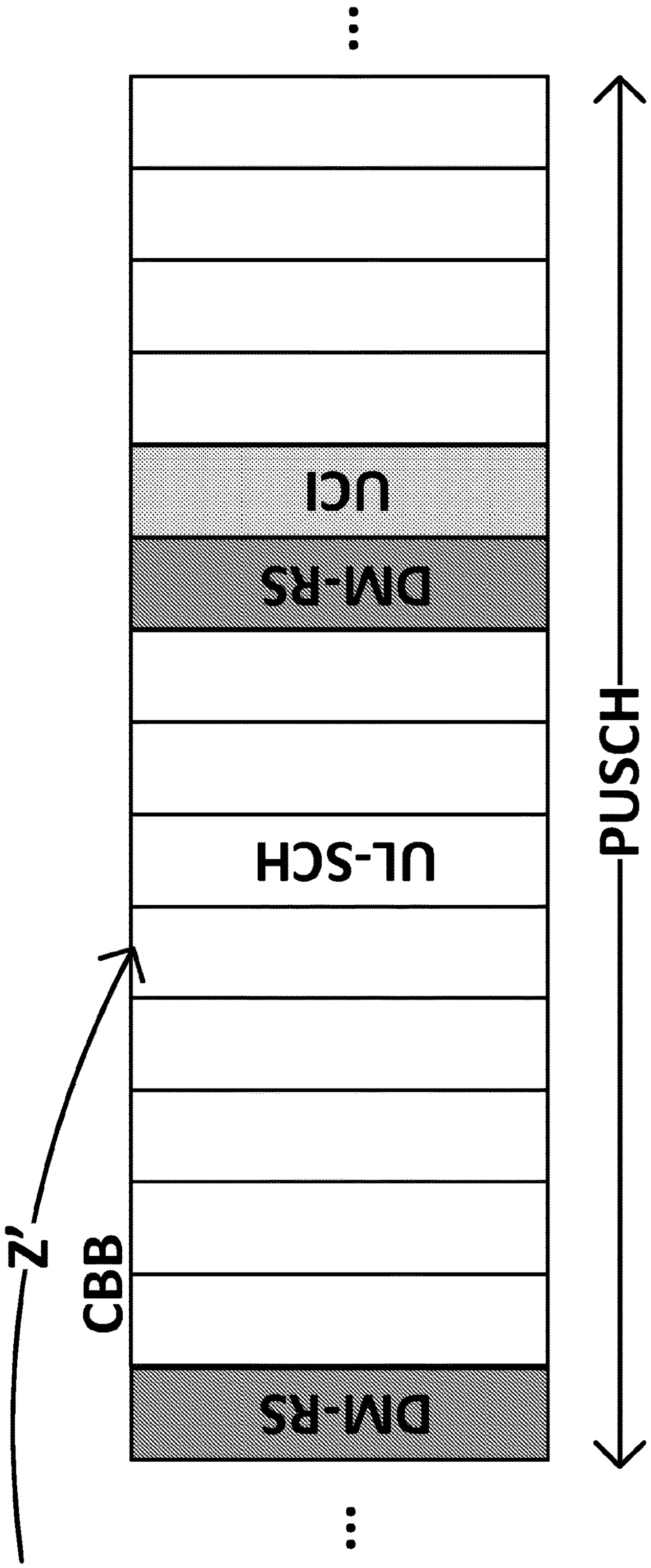

In one embodiment, the UCI transmission is performed after the first DM-RS symbol of PUSCH satisfying UE capability for Z' and Z taking into account CBBs boundaries. An example of a corresponding embodiment is illustrated in FIG. 5.

Figure 6:
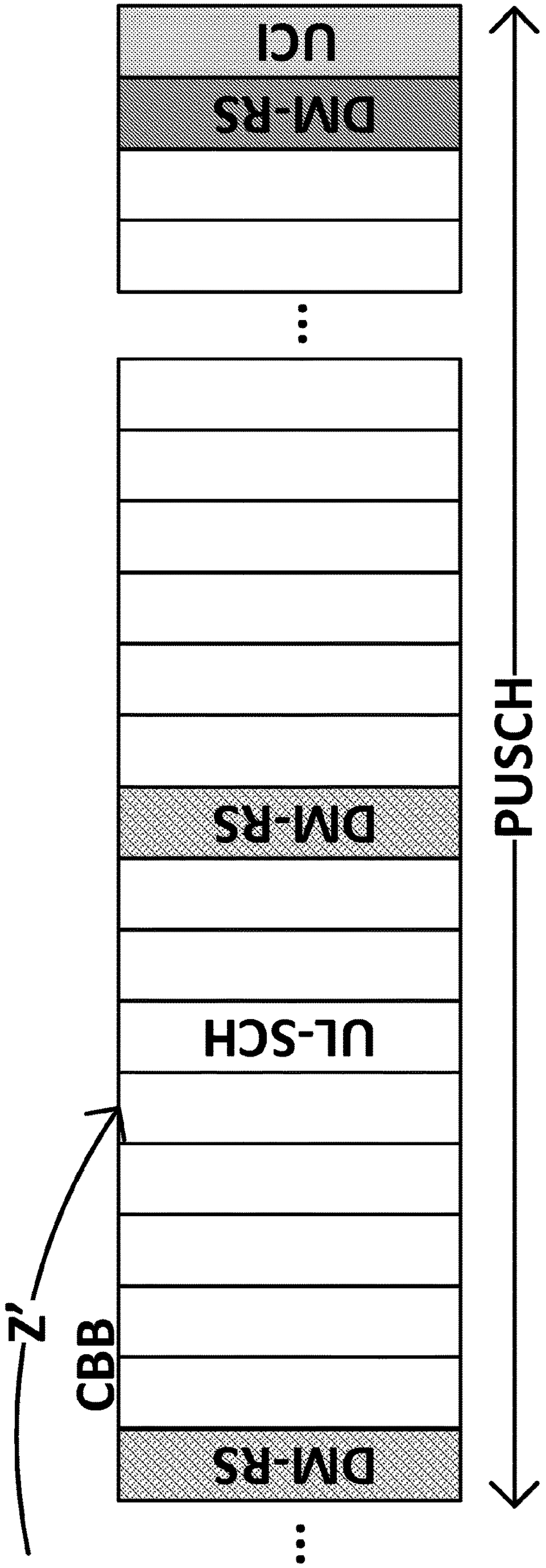

In one embodiment, the UCI transmission can be postponed until the end of UL portion of TDD period or in the last part of PUSCH transmission after UL-SCH. An example of a corresponding embodiment is illustrated in FIG. 6.

Figure 7:
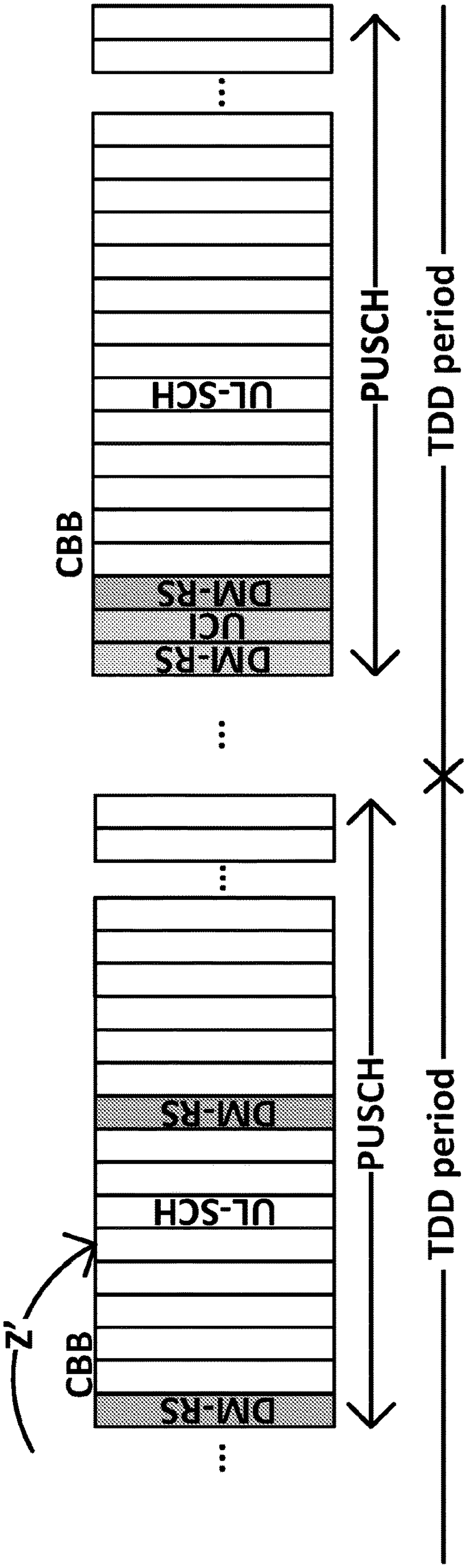

In one embodiments, the UCI transmission can be postponed until the next TDD period. In such embodiments, the UCI transmission can be based on front loaded or other approaches proposed in the above embodiment. An example of a corresponding embodiment is illustrated in FIG. 7.

In some embodiments, the reception of UCI may be acknowledged by the receiving gNB. More specially, UCI can be considered as a special code block bundle (CBB). The corresponding CBB may be assigned with a HARQ process number to allow identification of the UCI transmission. Then the corresponding UCI transmission can be acknowledged by gNB in another DCI. In such embodiments, if the DCI that acknowledges UCI transmission is not received within some period of time after transmission of UCI, the UCI (e.g., beam indication) is considered as not applicable. In another example of this embodiment if UCI transmission is received within some period of time after transmission of the UCI, the UCI (e.g., containing preferred beam such as indicated by CRI index of CSI-RS resource) is considered as applicable for all channel transmissions (PDSCH, PUSCH) after a predetermined time.

In another example, a dedicated CSI triggering state for CSI triggering field in the DCI can be used to acknowledge UCI transmission. For example, if DCI is transmitted and contains a CSI field set to the pre-determined particular value, the corresponding UCI may be considered as correctly received or not correctly received by gNB. If the UCI is positively acknowledged by gNB, the preferred beam measured in CSI-RS and indicated in UCI by the UE is considered as applicable to other physical channels (PDSCH, PUSCH) after pre-determined time interval.

SYSTEMS AND IMPLEMENTATIONS

Figure 8:
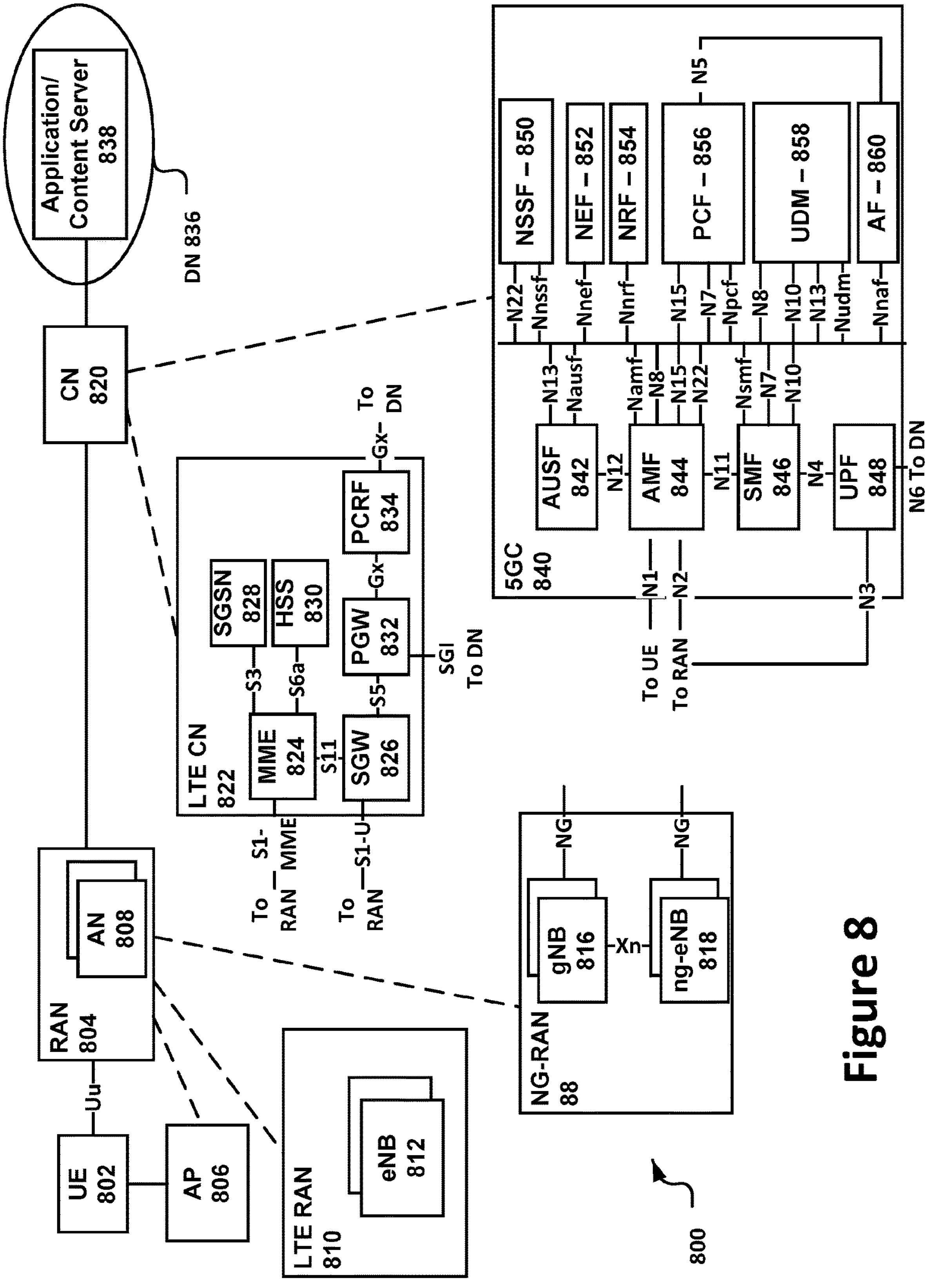
FIG. 8 schematically illustrates a wireless network in accordance with various embodiments.

FIGS. 8-9 illustrate various systems, devices, and components that may implement aspects of disclosed embodiments.

FIG. 8 illustrates a network 800 in accordance with various embodiments. The network 800 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 800 may include a UE 802, which may include any mobile or non-mobile computing device designed to communicate with a RAN 804 via an over-the-air connection. The UE 802 may be communicatively coupled with the RAN 804 by a Uu interface. The UE 802 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 800 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 802 may additionally communicate with an AP 806 via an over-the-air connection. The AP 806 may manage a WLAN connection, which may serve to offload some/all network traffic from the RAN 804. The connection between the UE 802 and the AP 806 may be consistent with any IEEE 802.11 protocol, wherein the AP 806 could be a wireless fidelity (Wi-Fi®) router. In some embodiments, the UE 802, RAN 804, and AP 806 may utilize cellular-WLAN aggregation (for example, LWA/LWIP). Cellular-WLAN aggregation may involve the UE 802 being configured by the RAN 804 to utilize both cellular radio resources and WLAN resources.

The RAN 804 may include one or more access nodes, for example, AN 808. AN 808 may terminate air-interface protocols for the UE 802 by providing access stratum protocols including RRC, PDCP, RLC, MAC, and L1 protocols. In this manner, the AN 808 may enable data/voice connectivity between CN 820 and the UE 802. In some embodiments, the AN 808 may be implemented in a discrete device or as one or more software entities running on server computers as part of, for example, a virtual network, which may be referred to as a CRAN or virtual baseband unit pool. The AN 808 be referred to as a BS, gNB, RAN node, eNB, ng-eNB, NodeB, RSU, TRxP, TRP, etc. The AN 808 may be a macrocell base station or a low power base station for providing femtocells, picocells or other like cells having smaller coverage areas, smaller user capacity, or higher bandwidth compared to macrocells.

In embodiments in which the RAN 804 includes a plurality of ANs, they may be coupled with one another via an X2 interface (if the RAN 804 is an LTE RAN) or an Xn interface (if the RAN 804 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 804 may each manage one or more cells, cell groups, component carriers, etc. to provide the UE 802 with an air interface for network access. The UE 802 may be simultaneously connected with a plurality of cells provided by the same or different ANs of the RAN 804. For example, the UE 802 and RAN 804 may use carrier aggregation to allow the UE 802 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 804 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 802 or AN 808 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 804 may be an LTE RAN 810 with eNBs, for example, eNB 812. The LTE RAN 810 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 804 may be an NG-RAN 814 with gNBs, for example, gNB 816, or ng-eNBs, for example, ng-eNB 818. The gNB 816 may connect with 5G-enabled UEs using a 5G NR interface. The gNB 816 may connect with a 5G core through an NG interface, which may include an N2 interface or an N3 interface. The ng-eNB 818 may also connect with the 5G core through an NG interface, but may connect with a UE via an LTE air interface. The gNB 816 and the ng-eNB 818 may connect with each other over an Xn interface.

In some embodiments, the NG interface may be split into two parts, an NG user plane (NG-U) interface, which carries traffic data between the nodes of the NG-RAN 814 and a UPF 848 (e.g., N3 interface), and an NG control plane (NG-C) interface, which is a signaling interface between the nodes of the NG-RAN 814 and an AMF 844 (e.g., N2 interface).

The NG-RAN 814 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 802 can be configured with multiple BWPs where each BWP configuration has a different SCS. When a BWP change is indicated to the UE 802, the SCS of the transmission is changed as well. Another use case example of BWP is related to power saving. In particular, multiple BWPs can be configured for the UE 802 with different amount of frequency resources (for example, PRBs) to support data transmission under different traffic loading scenarios. A BWP containing a smaller number of PRBs can be used for data transmission with small traffic load while allowing power saving at the UE 802 and in some cases at the gNB 816. A BWP containing a larger number of PRBs can be used for scenarios with higher traffic load.

The RAN 804 is communicatively coupled to CN 820 that includes network elements to provide various functions to support data and telecommunications services to customers/subscribers (for example, users of UE 802). The components of the CN 820 may be implemented in one physical node or separate physical nodes. In some embodiments, NFV may be utilized to virtualize any or all of the functions provided by the network elements of the CN 820 onto physical compute/storage resources in servers, switches, etc. A logical instantiation of the CN 820 may be referred to as a network slice, and a logical instantiation of a portion of the CN 820 may be referred to as a network sub-slice.

In some embodiments, the CN 820 may be an LTE CN 822, which may also be referred to as an EPC. The LTE CN 822 may include MME 824, SGW 826, SGSN 828, HSS 830, PGW 832, and PCRF 834 coupled with one another over interfaces (or "reference points") as shown. Functions of the elements of the LTE CN 822 may be briefly introduced as follows.

The MME 824 may implement mobility management functions to track a current location of the UE 802 to facilitate paging, bearer activation/deactivation, handovers, gateway selection, authentication, etc.

The SGW 826 may terminate an S1 interface toward the RAN and route data packets between the RAN and the LTE CN 822. The SGW 826 may be a local mobility anchor point for inter-RAN node handovers and also may provide an anchor for inter-3GPP mobility. Other responsibilities may include lawful intercept, charging, and some policy enforcement.

The SGSN 828 may track a location of the UE 802 and perform security functions and access control. In addition, the SGSN 828 may perform inter-EPC node signaling for mobility between different RAT networks; PDN and S-GW selection as specified by MME 824; MME selection for handovers; etc. The S3 reference point between the MME 824 and the SGSN 828 may enable user and bearer information exchange for inter-3GPP access network mobility in idle/active states.

The HSS 830 may include a database for network users, including subscription-related information to support the network entities' handling of communication sessions. The HSS 830 can provide support for routing/roaming, authentication, authorization, naming/addressing resolution, location dependencies, etc. An Sha reference point between the HSS 830 and the MME 824 may enable transfer of subscription and authentication data for authenticating/authorizing user access to the LTE CN 820.

The PGW 832 may terminate an SGi interface toward a data network (DN) 836 that may include an application/content server 838. The PGW 832 may route data packets between the LTE CN 822 and the data network 836. The PGW 832 may be coupled with the SGW 826 by an S5 reference point to facilitate user plane tunneling and tunnel management. The PGW 832 may further include a node for policy enforcement and charging data collection (for example, PCEF). Additionally, the SGi reference point between the PGW 832 and the data network 836 may be an operator external public, a private PDN, or an intra-operator packet data network, for example, for provision of IMS services. The PGW 832 may be coupled with a PCRF 834 via a Gx reference point.

The PCRF 834 is the policy and charging control element of the LTE CN 822. The PCRF 834 may be communicatively coupled to the app/content server 838 to determine appropriate QoS and charging parameters for service flows. The PCRF 832 may provision associated rules into a PCEF (via Gx reference point) with appropriate TFT and QCI.

In some embodiments, the CN 820 may be a 5GC 840. The 5GC 840 may include an AUSF 842, AMF 844, SMF 846, UPF 848, NSSF 850, NEF 852, NRF 854, PCF 856, UDM 858, and AF 860 coupled with one another over interfaces (or "reference points") as shown. Functions of the elements of the 5GC 840 may be briefly introduced as follows.

The AUSF 842 may store data for authentication of UE 802 and handle authentication-related functionality. The AUSF 842 may facilitate a common authentication framework for various access types. In addition to communicating with other elements of the 5GC 840 over reference points as shown, the AUSF 842 may exhibit an Nausf service-based interface.

The AMF 844 may allow other functions of the 5GC 840 to communicate with the UE 802 and the RAN 804 and to subscribe to notifications about mobility events with respect to the UE 802. The AMF 844 may be responsible for registration management (for example, for registering UE 802), connection management, reachability management, mobility management, lawful interception of AMF-related events, and access authentication and authorization. The AMF 844 may provide transport for SM messages between the UE 802 and the SMF 846, and act as a transparent proxy for routing SM messages. AMF 844 may also provide transport for SMS messages between UE 802 and an SMSF. AMF 844 may interact with the AUSF 842 and the UE 802 to perform various security anchor and context management functions. Furthermore, AMF 844 may be a termination point of a RAN CP interface, which may include or be an N2 reference point between the RAN 804 and the AMF 844; and the AMF 844 may be a termination point of NAS (N1) signaling, and perform NAS ciphering and integrity protection. AMF 844 may also support NAS signaling with the UE 802 over an N3 IWF interface.

The SMF 846 may be responsible for SM (for example, session establishment, tunnel management between UPF 848 and AN 808); UE IP address allocation and management (including optional authorization); selection and control of UP function; configuring traffic steering at UPF 848 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 844 over N2 to AN 808; and determining SSC mode of a session. SM may refer to management of a PDU session, and a PDU session or "session" may refer to a PDU connectivity service that provides or enables the exchange of PDUs between the UE 802 and the data network 836.

The UPF 848 may act as an anchor point for intra-RAT and inter-RAT mobility, an external PDU session point of interconnect to data network 836, and a branching point to support multi-homed PDU session. The UPF 848 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 848 may include an uplink classifier to support routing traffic flows to a data network.

The NSSF 850 may select a set of network slice instances serving the UE 802. The NSSF 850 may also determine allowed NSSAI and the mapping to the subscribed S-NSSAIs, if needed. The NSSF 850 may also determine the AMF set to be used to serve the UE 802, or a list of candidate AMFs based on a suitable configuration and possibly by querying the NRF 854. The selection of a set of network slice instances for the UE 802 may be triggered by the AMF 844 with which the UE 802 is registered by interacting with the NS SF 850, which may lead to a change of AMF. The NSSF 850 may interact with the AMF 844 via an N22 reference point; and may communicate with another NSSF in a visited network via an N31 reference point (not shown). Additionally, the NSSF 850 may exhibit an Nnssf service-based interface.

The NEF 852 may securely expose services and capabilities provided by 3GPP network functions for third party, internal exposure/re-exposure, AFs (e.g., AF 860), edge computing or fog computing systems, etc. In such embodiments, the NEF 852 may authenticate, authorize, or throttle the AFs. NEF 852 may also translate information exchanged with the AF 860 and information exchanged with internal network functions. For example, the NEF 852 may translate between an AF-Service-Identifier and an internal 5GC information. NEF 852 may also receive information from other NFs based on exposed capabilities of other NFs. This information may be stored at the NEF 852 as structured data, or at a data storage NF using standardized interfaces. The stored information can then be re-exposed by the NEF 852 to other NFs and AFs, or used for other purposes such as analytics. Additionally, the NEF 852 may exhibit an Nnef service-based interface.

The NRF 854 may support service discovery functions, receive NF discovery requests from NF instances, and provide the information of the discovered NF instances to the NF instances. NRF 854 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 854 may exhibit the Nnrf service-based interface.

The PCF 856 may provide policy rules to control plane functions to enforce them, and may also support unified policy framework to govern network behavior. The PCF 856 may also implement a front end to access subscription information relevant for policy decisions in a UDR of the UDM 858. In addition to communicating with functions over reference points as shown, the PCF 856 exhibit an Npcf service-based interface.

The UDM 858 may handle subscription-related information to support the network entities' handling of communication sessions, and may store subscription data of UE 802. For example, subscription data may be communicated via an N8 reference point between the UDM 858 and the AMF 844. The UDM 858 may include two parts, an application front end and a UDR.

The UDR may store subscription data and policy data for the UDM 858 and the PCF 856, and/or structured data for exposure and application data (including PFDs for application detection, application request information for multiple UEs 802) for the NEF 852. The Nudr service-based interface may be exhibited by the UDR 221 to allow the UDM 858, PCF 856, and NEF 852 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 858 may exhibit the Nudm service-based interface.

The AF 860 may provide application influence on traffic routing, provide access to NEF, and interact with the policy framework for policy control.

In some embodiments, the 5GC 840 may enable edge computing by selecting operator/3$^{rd}$ party services to be geographically close to a point that the UE 802 is attached to the network. This may reduce latency and load on the network. To provide edge-computing implementations, the 5GC 840 may select a UPF 848 close to the UE 802 and execute traffic steering from the UPF 848 to data network 836 via the N6 interface. This may be based on the UE subscription data, UE location, and information provided by the AF 860. In this way, the AF 860 may influence UPF (re)selection and traffic routing. Based on operator deployment, when AF 860 is considered to be a trusted entity, the network operator may permit AF 860 to interact directly with relevant NFs. Additionally, the AF 860 may exhibit an Naf service-based interface.

The data network 836 may represent various network operator services, Internet access, or third party services that may be provided by one or more servers including, for example, application/content server 838.

FIG. 9 schematically illustrates a wireless network 900 in accordance with various embodiments. The wireless network 900 may include a UE 902 in wireless communication with an AN 904. The UE 902 and AN 904 may be similar to, and substantially interchangeable with, like-named components described elsewhere herein.

The UE 902 may be communicatively coupled with the AN 904 via connection 906. The connection 906 is illustrated as an air interface to enable communicative coupling, and can be consistent with cellular communications protocols such as an LTE protocol or a 5G NR protocol operating at mmWave or sub-6 GHz frequencies.

The UE 902 may include a host platform 908 coupled with a modem platform 910. The host platform 908 may include application processing circuitry 912, which may be coupled with protocol processing circuitry 914 of the modem platform 910. The application processing circuitry 912 may run various applications for the UE 902 that source/sink application data. The application processing circuitry 912 may further implement one or more layer operations to transmit/receive application data to/from a data network. These layer operations may include transport (for example UDP) and Internet (for example, IP) operations The protocol processing circuitry 914 may implement one or more of layer operations to facilitate transmission or reception of data over the connection 906. The layer operations implemented by the protocol processing circuitry 914 may include, for example, MAC, RLC, PDCP, RRC and NAS operations.

The modem platform 910 may further include digital baseband circuitry 916 that may implement one or more layer operations that are "below" layer operations performed by the protocol processing circuitry 914 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 910 may further include transmit circuitry 918, receive circuitry 920, RF circuitry 922, and RF front end (RFFE) 924, which may include or connect to one or more antenna panels 926. Briefly, the transmit circuitry 918 may include a digital-to-analog converter, mixer, intermediate frequency (IF) components, etc.; the receive circuitry 920 may include an analog-to-digital converter, mixer, IF components, etc.; the RF circuitry 922 may include a low-noise amplifier, a power amplifier, power tracking components, etc.; RFFE 924 may include filters (for example, surface/bulk acoustic wave filters), switches, antenna tuners, beamforming components (for example, phase-array antenna components), etc. The selection and arrangement of the components of the transmit circuitry 918, receive circuitry 920, RF circuitry 922, RFFE 924, and antenna panels 926 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 914 may include one or more instances of control circuitry (not shown) to provide control functions for the transmit/receive components.

A UE reception may be established by and via the antenna panels 926, RFFE 924, RF circuitry 922, receive circuitry 920, digital baseband circuitry 916, and protocol processing circuitry 914. In some embodiments, the antenna panels 926 may receive a transmission from the AN 904 by receive-beamforming signals received by a plurality of antennas/antenna elements of the one or more antenna panels 926.

A UE transmission may be established by and via the protocol processing circuitry 914, digital baseband circuitry 916, transmit circuitry 918, RF circuitry 922, RFFE 924, and antenna panels 926. In some embodiments, the transmit components of the UE 904 may apply a spatial filter to the data to be transmitted to form a transmit beam emitted by the antenna elements of the antenna panels 926.

Similar to the UE 902, the AN 904 may include a host platform 928 coupled with a modem platform 930. The host platform 928 may include application processing circuitry 932 coupled with protocol processing circuitry 934 of the modem platform 930. The modem platform may further include digital baseband circuitry 936, transmit circuitry 938, receive circuitry 940, RF circuitry 942, RFFE circuitry 944, and antenna panels 946. The components of the AN 904 may be similar to and substantially interchangeable with like-named components of the UE 902. In addition to performing data transmission/reception as described above, the components of the AN 908 may perform various logical functions that include, for example, RNC functions such as radio bearer management, uplink and downlink dynamic radio resource management, and data packet scheduling.

Figure 10:
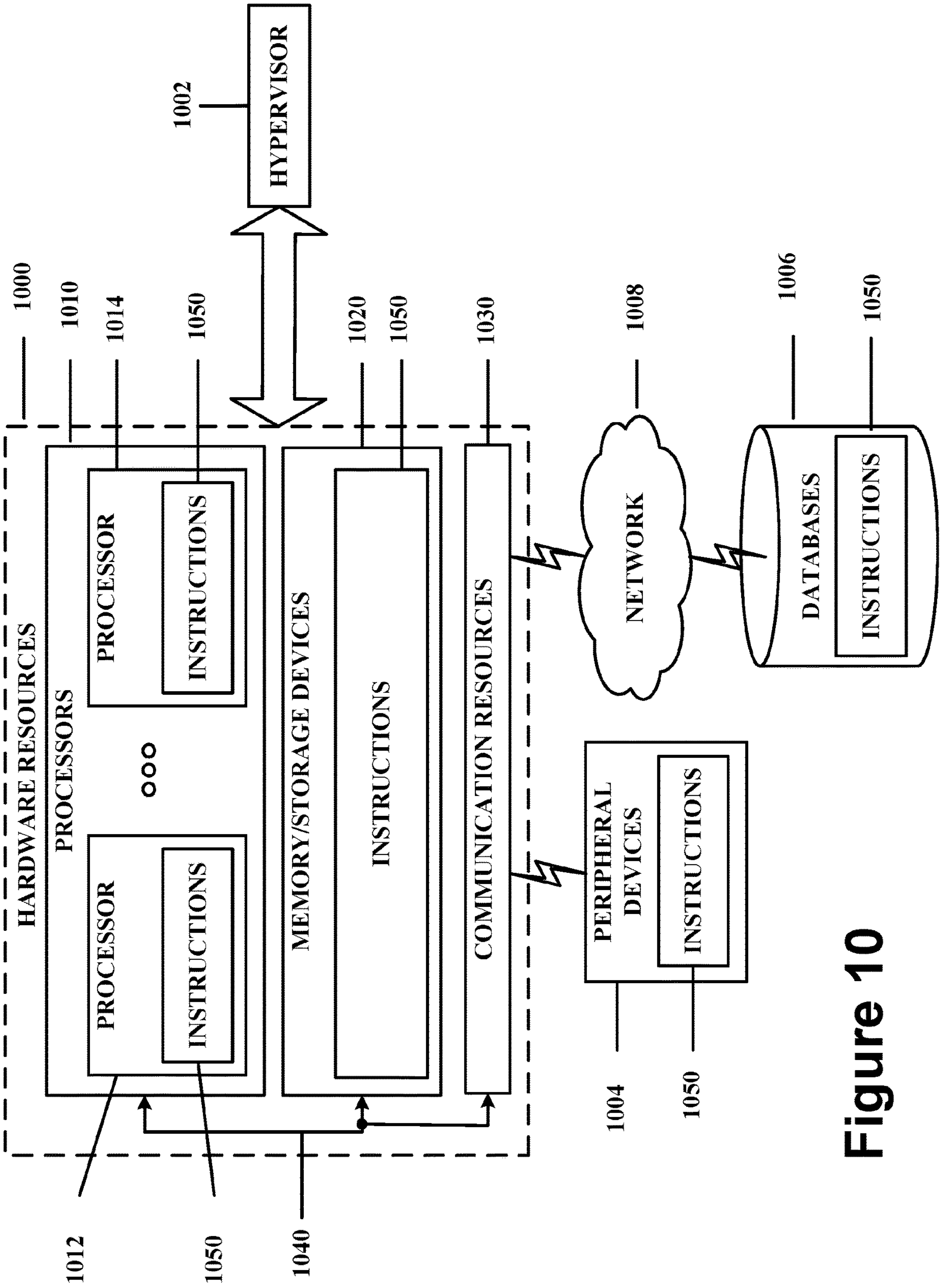
FIG. 10 is a block diagram illustrating components, according to some example embodiments, able to read instructions from a machine-readable or computer-readable medium (e.g., a non-transitory machine-readable storage medium) and perform any one or more of the methodologies discussed herein.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040 or other interface circuitry. For embodiments where node virtualization (e.g., NFV) is utilized, a hypervisor 1002 may be executed to provide an execution environment for one or more network slices/sub-slices to utilize the hardware resources 1000.

The processors 1010 may include, for example, a processor 1012 and a processor 1014. The processors 1010 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1020 may include main memory, disk storage, or any suitable combination thereof. The memory/storage devices 1020 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1030 may include interconnection or network interface controllers, components, or other suitable devices to communicate with one or more peripheral devices 1004 or one or more databases 1006 or other network elements via a network 1008. For example, the communication resources 1030 may include wired communication components (e.g., for coupling via USB, Ethernet, etc.), cellular communication components, NFC components, Bluetooth® (or Bluetooth® Low Energy) components, Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

Example Procedures

Figure 11:
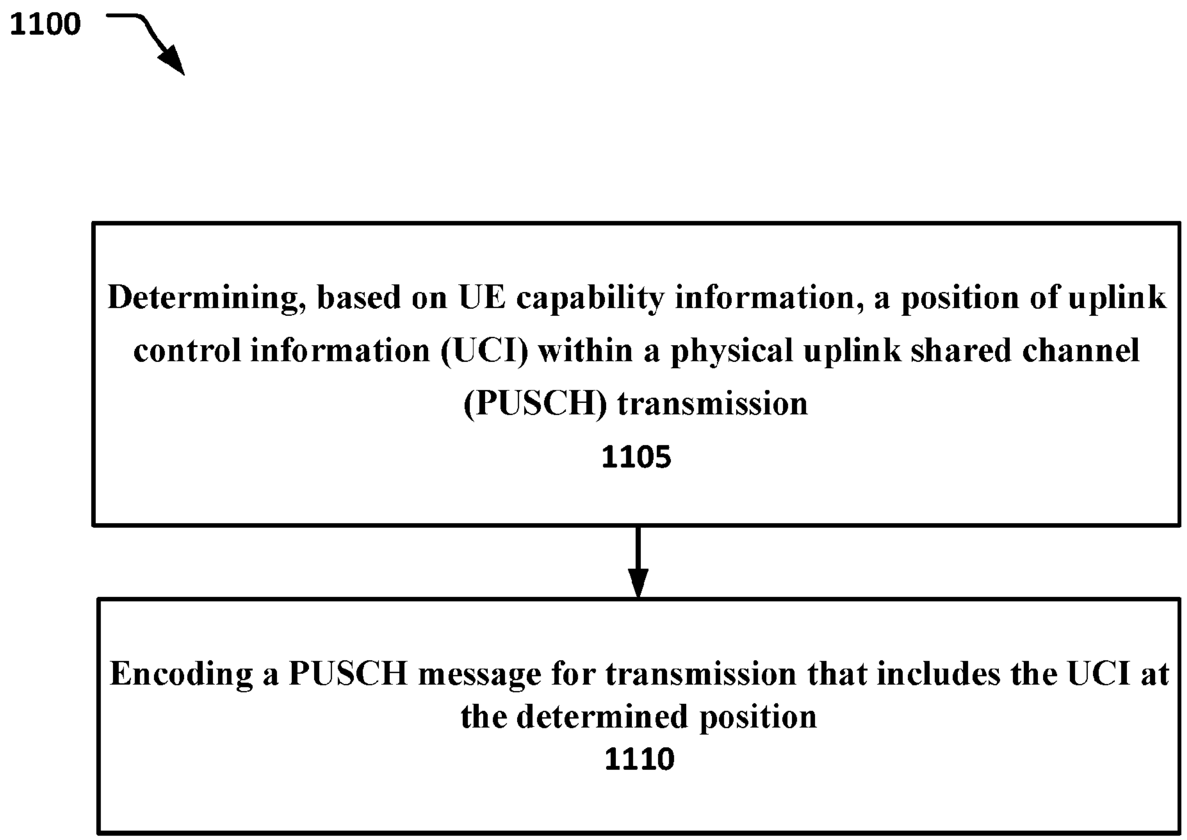

In some embodiments, the electronic device(s), network(s), system(s), chip(s) or component(s), or portions or implementations thereof, of FIGS. 8-10, or some other FIG. herein, may be configured to perform one or more processes, techniques, or methods as described herein, or portions thereof. One such process is depicted in FIG. 11. For example, process 1100 may include, at 1105, determining, based on UE capability information, a position of uplink control information (UCI) within a physical uplink shared channel (PUSCH) transmission. The process further includes, at 1110, encoding a PUSCH message for transmission that includes the UCI at the determined position.

Figure 12:
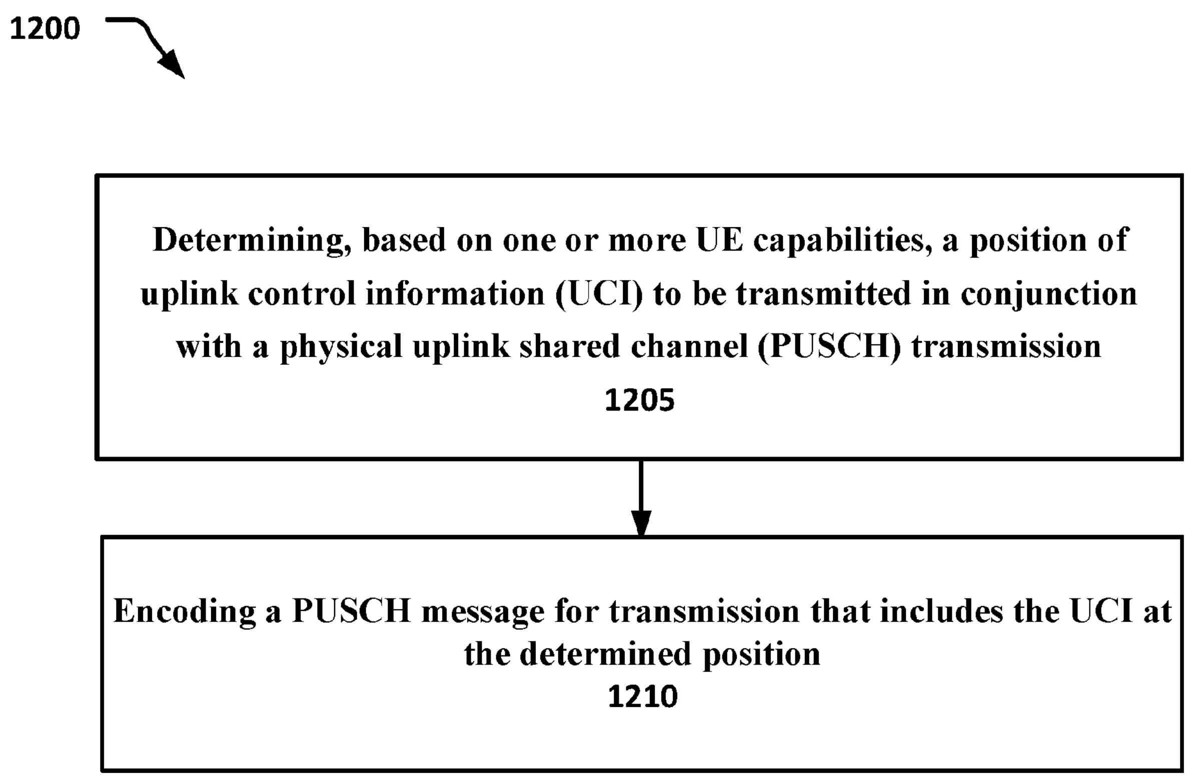

Another such process is illustrated in FIG. 12. In this example, the process 1200 includes, at 1205, determining, based on one or more UE capabilities, a position of uplink control information (UCI) to be transmitted in conjunction with a physical uplink shared channel (PUSCH) transmission. The process further includes, at 1210, encoding a PUSCH message for transmission that includes the UCI at the determined position.

Another such process is illustrated in FIG. 13. In this example, the process 1300 includes, at 1305, receiving, from a user equipment (UE), uplink control information (UCI) transmitted in conjunction with a physical uplink shared channel (PUSCH) transmission. The process further includes, at 1310, encoding a message for transmission to the UE that includes downlink control information (DCI) that acknowledges the UCI, wherein the DCI includes an indication of a hybrid automatic repeat request (HARD) process number associated with the UCI.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include a method of flexible uplink control information (UCI) transmission, wherein the method includes:

Scheduling of the PUSCH transmission multiplexing uplink shared channel (UL SCH) and UCI;

Determining position of UCI transmission according to UE capability and based on the signalling indication from the serving cell and other parameters of PUSCH; and Transmission of PUSCH with UL-SCH and UCI.

Example 2 may include the method of example 1 or some other example herein, wherein UCI is transmitted in the earliest DFT-s-OFDM before codeblock bundle (CBB) satisfying UE capability for Z' and Z, where Z' is minimum time between last symbol of aperiodic CSI-RS used for measurements and UCI report and Z is minimum time between last symbol of PDCCH and UCI.

Example 3 may include the method of example 2 or some other example herein, wherein UCI is transmitted with additional DM-RS.

Example 4 may include the method of example 1 or some other example herein, wherein UCI is transmitted in the earliest DFT-s-OFDM after DM-RS of PUSCH satisfying UE capability for Z' and Z, where Z' is minimum time between last symbol of aperiodic CSI-RS used for measurements and UCI report and Z is minimum time between last symbol of PDCCH and UCI.

Example 5 may include the method of example 1 or some other example herein, wherein UCI is transmitted in the last DFT-s-OFDM symbols of PUSCH.

Example 6 may include the method of example 1 or some other example herein, wherein UCI is transmitted in the first DFT-s-OFDM symbols of PUSCH part of the next TDD period.

Example 7 may include the method of example 1 or some other example herein, wherein UCI punctures PUSCH transmission.

Example 8 may include the method of example 2 or some other example herein, wherein PUSCH transmission is performed on the DFT-s-OFDM symbols not allocated for UCI transmission (rate matching operation).

Example 9 may include the system and method of example 1 or some other example herein, wherein UCI is acknowledged by DCI transmission within pre-determined time after reporting of UCI.

Example 10 may include the system and method of example 9 or some other example herein, wherein UCI is assigned with HARQ process.

Example 11 may include the system and method of example 9 or some other example herein, wherein UCI after acknowledgment is considered as valid.

Example 12 may include the system and method of example 10 or some other example herein, wherein if UCI contains CRI (CSI-RS Resource Index), the beam used to transmit corresponding CSI-RS is also applied to other downlink and uplink transmission.

Example 13 may include a method comprising:

receiving a message to schedule transmission of a physical uplink shared channel with uplink control information (UCI) multiplexed with an physical uplink shared channel (PUSCH);

determining position of the UCI in the transmission based on one or more of: a UE capability, an indication received from a serving cell, and/or a parameter of the PUSCH; and encoding the PUSCH for transmission based on the determined position of the UCI.

Example 14 may include the method of example 13 or some other example herein, wherein the position of the UCI is determined as an earliest DFT-s-OFDM symbol before a codeblock bundle (CBB) satisfying UE capability for Z' and Z, wherein Z' is a minimum time between a last symbol of aperiodic CSI-RS used for measurements and UCI report, and Z is a minimum time between a last symbol of a PDCCH and the UCI.

Example 15 may include the method of example 13 or some other example herein, wherein the position of the UCI is determined as an earliest DFT-s-OFDM symbol after DM-RS of PUSCH satisfying UE capability for Z' and Z, wherein Z' is a minimum time between a last symbol of aperiodic CSI-RS used for measurements and UCI report, and Z is a minimum time between a last symbol of a PDCCH and the UCI.

Example 16 may include the method of example 14-15 or some other example herein, wherein the PDCCH is the message to schedule transmission of the PUSCH.

Example 17 may include the method of example 13-16 or some other example herein, wherein UCI is transmitted with additional DM-RS.

Example 18 may include the method of example 13-17 or some other example herein, further comprising receiving, from a gNB, an acknowledgement that the gNB has received the UCI.

Example 19 may include the method of example 18 or some other example herein, wherein the acknowledgement is included in a downlink control information (DCI).

Example 20 may include the method of example 18-19 or some other example herein, wherein the acknowledgement is associated with a HARQ process ID.

Example 21 may include the method of example 13-20 or some other example herein, wherein the method is performed by a user equipment (UE) or a portion thereof.

Example X1 includes an apparatus of a user equipment (UE) comprising:

memory to store capability information associated with the UE; and processing circuitry, coupled with the memory, to:

determine, based on the UE capability information, a position of uplink control information (UCI) within a physical uplink shared channel (PUSCH) transmission; and encode a PUSCH message for transmission that includes the UCI at the determined position.

Example X2 includes the apparatus of example X1 or some other example herein, wherein the UE capability information includes an indication of a minimum time between a last symbol of an aperiodic channel state information-reference signal (CSI-RS) used for measurements and the UCI.

Example X3 includes the apparatus of example X1 or some other example herein, wherein the UE capability information includes an indication of a minimum time between a last symbol of a physical downlink control channel (PDCCH) transmission and the UCI.

Example X4 includes the apparatus of example X1 or some other example herein, wherein the position of the UCI is based on an earliest discrete Fourier transform spread orthogonal frequency division multiplexing (DFT-s-OFDM) symbol before a codeblock bundle (CBB) satisfying a capability in the UE capability information.

Example X5 includes the apparatus of example X4 or some other example herein, wherein the position of the UCI is between two adjacent CBBs.

Example X6 includes the apparatus of example X1 or some other example herein, wherein transmission of the UCI within the PUSCH message includes a demodulation reference signal (DM-RS) symbol transmitted in a symbol adjacent to the UCI.

Example X7 includes the apparatus of example X1 or some other example herein, wherein transmission of the UCI within the PUSCH message is performed after a first DM-RS symbol satisfying a capability in the UE capability information.

Example X8 includes the apparatus of example X1 or some other example herein, wherein transmission of the UCI within the PUSCH message is postponed until an end of an uplink (UL) portion of a time division duplex (TDD) period.

Example X9 includes the apparatus of any of examples X1-X8 or some other example herein, wherein the PUSCH includes uplink shared channel (UL SCH) information.

Example X10 includes the apparatus of example X9 or some other example herein, wherein transmission of the UCI within the PUSCH message is postponed until after transmission of the UL SCH information.

Example X11 includes the apparatus of any of examples X1-X10, further comprising receiving, from a next-generation NodeB (gNB), downlink control information (DCI) that acknowledges the UCI.

Example X12 includes the apparatus of example X11 or some other example herein, wherein the DCI includes an indication of a hybrid automatic repeat request (HARM) process number associated with the UCI.

Example X13 includes one or more computer-readable media storing instructions that, when executed by one or more processors, cause a user equipment (UE) to:

determine, based on one or more UE capabilities, a position of uplink control information (UCI) to be transmitted in conjunction with a physical uplink shared channel (PUSCH) transmission; and encode a PUSCH message for transmission based on the determined UCI position.

Example X14 includes the one or more computer-readable media of example X13 or some other example herein, wherein the one or more UE capabilities includes an indication of a minimum time between a last symbol of an aperiodic channel state information-reference signal (CSI-RS) used for measurements and the UCI.

Example X15 includes the one or more computer-readable media of example X13 or some other example herein, wherein the one or more UE capabilities includes an indication of a minimum time between a last symbol of a physical downlink control channel (PDCCH) transmission and the UCI.

Example X16 includes the one or more computer-readable media of example X13 or some other example herein, wherein the position of the UCI is based on an earliest discrete Fourier transform spread orthogonal frequency division multiplexing (DFT-s-OFDM) symbol before a codeblock bundle (CBB) satisfying a capability in the UE capability information.

Example X17 includes the one or more computer-readable media of example X16 or some other example herein, wherein the position of the UCI is between two adjacent CBBs.

Example X18 includes the one or more computer-readable media of example X13 or some other example herein, wherein transmission of the UCI in conjunction with the PUSCH message:

includes a demodulation reference signal (DM-RS) symbol transmitted in a symbol adjacent to the UCI; or is performed after a first DM-RS symbol satisfying a capability in the UE capability information; or is postponed until an end of an uplink (UL) portion of a time division duplex (TDD) period.

Example X19 includes the one or more computer-readable media of any of examples X13-X18 or some other example herein, wherein the PUSCH includes uplink shared channel (UL SCH) information.

Example X20 includes the one or more computer-readable media of example X19 or some other example herein, wherein transmission of the UCI within the PUSCH message is postponed until after transmission of the UL SCH information.

Example X21 includes the one or more computer-readable media of any of examples X13-X20, wherein the media further stores instructions for causing the UE to receive, from a next-generation NodeB (gNB), downlink control information (DCI) that acknowledges the UCI, wherein the DCI includes an indication of a hybrid automatic repeat request (HARQ) process number associated with the UCI.

Example X22 includes one or more computer-readable media storing instructions that, when executed by one or more processors, cause a next-generation NodeB (gNB) to:

receive, from a user equipment (UE), uplink control information (UCI) transmitted in conjunction with a physical uplink shared channel (PUSCH) transmission; and encode a message for transmission to the UE that includes downlink control information (DCI) that acknowledges the UCI, wherein the DCI includes an indication of a hybrid automatic repeat request (HARQ) process number associated with the UCI.

Example X23 includes the one or more computer-readable media of example X22 or some other example herein, wherein the UCI is transmitted is between two adjacent codeblock bundles (CBBs).

Example X24 includes the one or more computer-readable media of example X22 or some other example herein, wherein the UCI transmitted in conjunction with the PUSCH transmission:

includes a demodulation reference signal (DM-RS) symbol transmitted in a symbol adjacent to the UCI; or is performed after a first DM-RS symbol satisfying a capability in the UE capability information; or is postponed until an end of an uplink (UL) portion of a time division duplex (TDD) period.

Example Z01 may include an apparatus comprising means to perform one or more elements of a method described in or related to any of examples 1-X24, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-X24, or any other method or process described herein.

Example Z03 may include an apparatus comprising logic, modules, or circuitry to perform one or more elements of a method described in or related to any of examples 1-X24, or any other method or process described herein.

Example Z04 may include a method, technique, or process as described in or related to any of examples 1-X24, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-X24, or portions thereof.

Example Z06 may include a signal as described in or related to any of examples 1-X24, or portions or parts thereof.

Example Z07 may include a datagram, packet, frame, segment, protocol data unit (PDU), or message as described in or related to any of examples 1-X24, or portions or parts thereof, or otherwise described in the present disclosure.

Example Z08 may include a signal encoded with data as described in or related to any of examples 1-X24, or portions or parts thereof, or otherwise described in the present disclosure.

Example Z09 may include a signal encoded with a datagram, packet, frame, segment, protocol data unit (PDU), or message as described in or related to any of examples 1-X24, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-X24, or portions thereof.

Example Z11 may include a computer program comprising instructions, wherein execution of the program by a processing element is to cause the processing element to carry out the method, techniques, or process as described in or related to any of examples 1-X24, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019 June). For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| AC | Application Client |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CFRA | Contention Free Random Access |
| CG | Cell Group |
| CGF | Charging Gateway Function |
| CHF | Charging Function |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSCF | call session control function |
| CSAR | Cloud Service Archive |
| CSI | Channel-State Information |

-continued

| | |
|---|---|
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell- specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |

-continued

| | |
|---|---|
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-U | GPRS Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |

-continued

| | |
|---|---|
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-I | MAC used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |

-continued

| | |
|---|---|
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTCmassive | MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non- Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| P-CSCF | Proxy CSCF |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |

-continued

| | |
|---|---|
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |

-continued

| | |
|---|---|
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time Rx Reception, Receiving, Receiver |
| S1AP | S1 Application Protocol |
| S1-MME | S1 for the control plane |
| S1-U | S1 for the user plane |
| S-CSCF | serving CSCF |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDT | Small Data Transmission |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH | SS/PBCH Block Resource Indicator, Synchronization |
| Block SSBRI | Signal Block Resource Indicator |
| SSC | Session and Service Continuity |
| SS-RSRP | Synchronization Signal based Reference Signal Received Power |

-continued

| | |
|---|---|
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, VLAN Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over- Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |

-continued

| | |
|---|---|
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

What is claimed is:

1. An apparatus of a user equipment (UE) comprising:

memory to store capability information associated with the UE; and processing circuitry, coupled with the memory, to:

determine, based on the UE capability information, a position of uplink control information (UCI) within a physical uplink shared channel (PUSCH) transmission, wherein the UE capability information includes an indication of a minimum time between a last symbol of an aperiodic channel state information-reference signal (CSI-RS) used for measurements and the UCI, and wherein the position of the UCI is determined as an earliest discrete Fourier transform spread orthogonal frequency division multiplexing (DFT-s-OFDM) symbol before a codeblock bundle (CBB) boundary that satisfies the minimum time; and encode a PUSCH message for transmission that includes the UCI at the determined position.

2. The apparatus of claim 1, wherein the UE capability information includes an indication of a minimum time between a last symbol of a physical downlink control channel (PDCCH) transmission and the UCI.

3. The apparatus of claim 1, wherein the position of the UCI is between two adjacent CBBs.

4. The apparatus of claim 1, wherein transmission of the UCI within the PUSCH message includes a demodulation reference signal (DM-RS) symbol transmitted in a symbol adjacent to the UCI.

5. The apparatus of claim 1, wherein transmission of the UCI within the PUSCH message is performed after a first DM-RS symbol satisfying a capability in the UE capability information.

6. The apparatus of claim 1, wherein transmission of the UCI within the PUSCH message is postponed until an end of an uplink (UL) portion of a time division duplex (TDD) period.

7. The apparatus of claim 1, wherein the PUSCH includes uplink shared channel (UL SCH) information.

8. The apparatus of claim 1, further comprising receiving, from a next-generation NodeB (gNB), downlink control information (DCI) that acknowledges the UCI.

9. One or more non-transitory computer-readable media storing instructions that, when executed by one or more processors, cause a user equipment (UE) to:

determine, based on one or more UE capabilities, a position of uplink control information (UCI) to be transmitted in conjunction with a physical uplink shared channel (PUSCH) transmission, wherein the one or more UE capabilities includes an indication of a minimum time between a last symbol of an aperiodic channel state information-reference signal (CSI-RS) used for measurements and the UCI, and wherein the position of the UCI is determined as an earliest discrete Fourier transform spread orthogonal frequency division multiplexing (DFT-s-OFDM) symbol before a codeblock bundle (CBB) boundary that satisfies the minimum time; and encode a PUSCH message for transmission based on the determined UCI position.

10. The one or more non-transitory computer-readable media of claim 9, wherein the one or more UE capabilities includes an indication of a minimum time between a last symbol of a physical downlink control channel (PDCCH) transmission and the UCI.

11. The one or more non-transitory computer-readable media of claim 9, wherein the position of the UCI is based on an earliest discrete Fourier transform spread orthogonal frequency division multiplexing (DFT-s-OFDM) symbol before a codeblock bundle (CBB) satisfying a capability in the UE capability information.

12. The one or more non-transitory computer-readable media of claim 9, wherein transmission of the UCI in conjunction with the PUSCH message:

includes a demodulation reference signal (DM-RS) symbol transmitted in a symbol adjacent to the UCI; or is performed after a first DM-RS symbol satisfying a capability in the UE capability information; or is postponed until an end of an uplink (UL) portion of a time division duplex (TDD) period.

13. The one or more non-transitory computer-readable media of claim 9, wherein the PUSCH includes uplink shared channel (UL SCH) information.

14. The one or more non-transitory computer-readable media of claim 9, wherein the media further stores instructions for causing the UE to receive, from a next-generation NodeB (gNB), downlink control information (DCI) that acknowledges the UCI, wherein the DCI includes an indication of a hybrid automatic repeat request (HARQ) process number associated with the UCI.

15. One or more non-transitory computer-readable media storing instructions that, when executed by one or more processors, cause a next-generation NodeB (gNB) to:

receive, from a user equipment (UE), uplink control information (UCI) transmitted in conjunction with a physical uplink shared channel (PUSCH) transmission, wherein the UCI is received at a position determined based on UE capability information including an indication of a minimum time between a last symbol of an aperiodic channel state information-reference signal (CSI-RS) used for measurements and the UCI, and wherein the position of the UCI is determined as an earliest discrete Fourier transform spread orthogonal frequency division multiplexing (DFT-s-OFDM) symbol before a codeblock bundle (CBB) boundary that satisfies the minimum time; and encode a message for transmission to the UE that includes downlink control information (DCI) that acknowledges the UCI, wherein the DCI includes an indication of a hybrid automatic repeat request (HARQ) process number associated with the UCI.

16. The one or more non-transitory computer-readable media of claim 15, wherein the UCI is transmitted between two adjacent codeblock bundles (CBBs).

17. The one or more non-transitory computer-readable media of claim 15, wherein the UCI transmitted in conjunction with the PUSCH transmission:

includes a demodulation reference signal (DM-RS) symbol transmitted in a symbol adjacent to the UCI; or is performed after a first DM-RS symbol satisfying a capability in the UE capability information; or is postponed until an end of an uplink (UL) portion of a time division duplex (TDD) period.

* * * * *